INVENTORS
FREDERICK B. SYLVANDER
ROBERT J. MOLNAR
BY Chas. N. Funkhouser
ATTORNEY

United States Patent Office 3,108,263
Patented Oct. 22, 1963

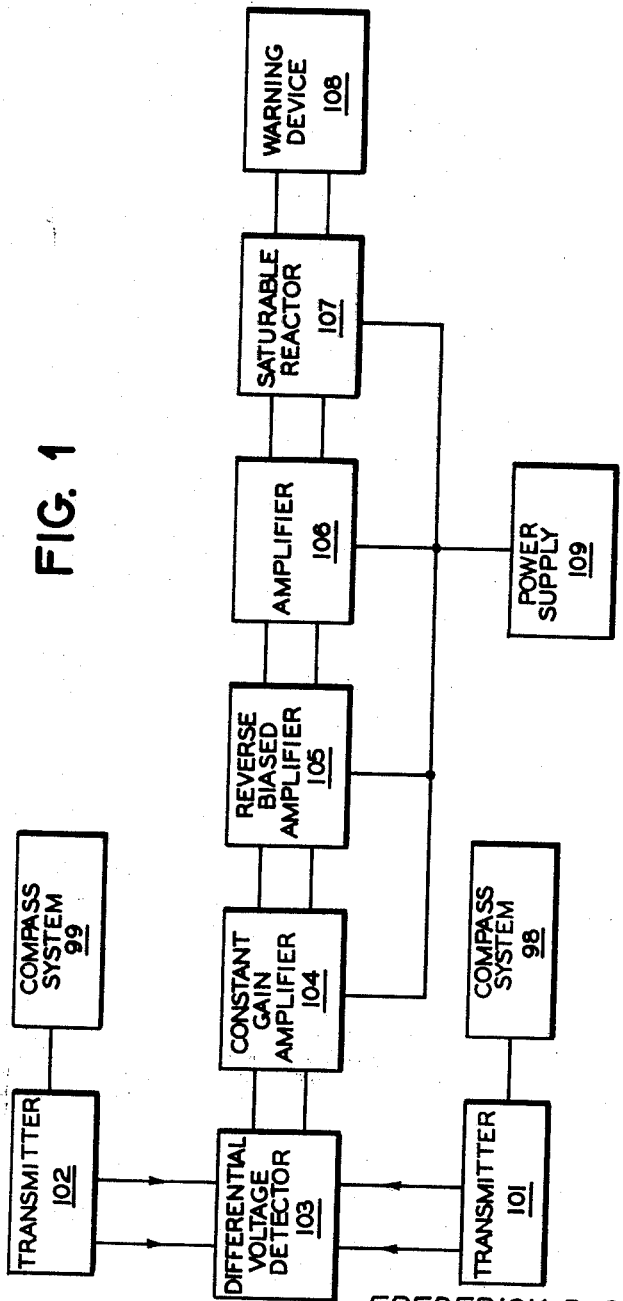

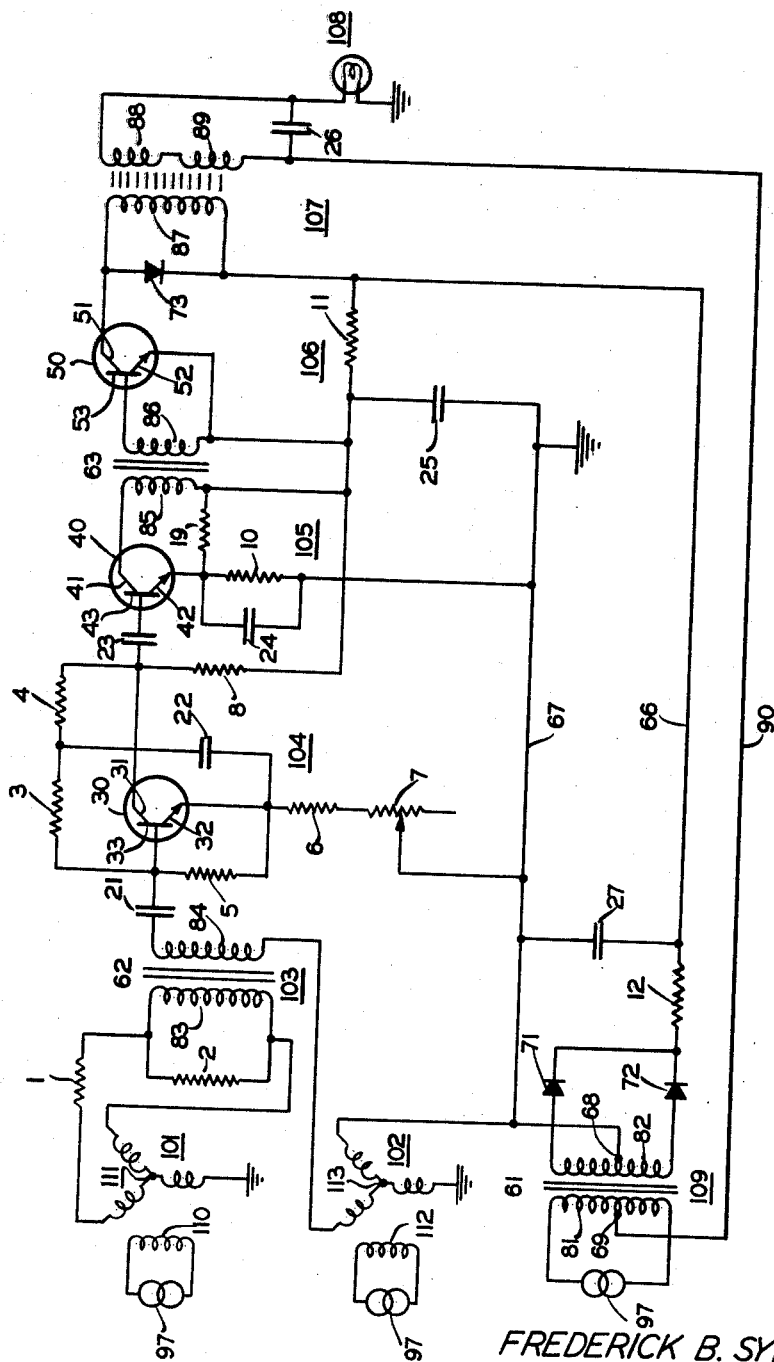

3,108,263
ERROR DETECTING AND INDICATING SYSTEM
Frederick B. Sylvander, Hackensack, N.J., and Robert J. Molnar, New York, N.Y., assignors to The Bendix Corporation, a corporation of Delaware
Filed Sept. 10, 1957, Ser. No. 683,132
5 Claims. (Cl. 340—268)

This invention relates to monitor systems and more particularly to monitor systems for detecting disparities between two systems being compared.

One object of the invention is to provide a reverse biased amplifier for detecting an error signal.

Another object of the invention is to use a reverse biased amplifier for detecting disparities between two systems being compared.

A further object is to provide an error signal detecting and indicating system which operates a warning or indicating device when two systems being compared are not in correspondence with one another.

Another object is to provide a monitoring system for operating a warning device when a predetermined minimum angular disparity exists between the angular positions of two compass systems.

A further object of this invention is to provide a detecting and warning system having only a few components.

Another object is to provide a detecting and warning system which is highly reliable and has a longer operating life than the system which it is to monitor.

In one form of the invention means are utilized for providing signals corresponding to the indication of two compass systems. The signals are applied to a differential voltage detector which develops an error signal proportional to the angular disparity between the two compass systems. The error signal is applied to a reverse biased amplifier which passes only alternate half cycles of predetermined amplitude. The output of the reverse biased amplifier may be used to operate a warning device.

The foregoing and other objects and advantages of this invention will appear more fully hereinafter from a consideration of the detailed description which follows, taken together with the accompanying drawings wherein several embodiments of the invention are illustrated by way of example. It is to be understood, however, that the drawings are for illustrative purposes only and are not to be construed as defining the limits of the invention.

In the drawings:

FIGURE 1 is a block diagram showing a detecting and indicating system constructed according to the invention.

FIGURE 2 is a schematic wiring diagram thereof.

Figure 4:
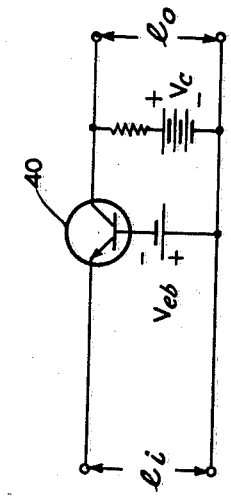
FIGURES 3, 4 and 5 are schematic wiring diagrams of several forms of the reverse biased amplifier shown.

In FIGURE 1, two synchronous transmitters 101 and 102 are actuated by compass systems 98 and 99, respectively, and provide signals corresponding to the indications of the compass systems. The transmitters are connected to a differential voltage detector 103 to provide an error signal, at its output, corresponding to the relative displacement of the transmitters. This signal is amplified by a constant gain amplifier 104 and applied to a reverse biased amplifier 105 which acts as a limiter or gate and amplifies only alternate half cycles of the signal having an amplitude greater than the reverse biasing voltage impressed thereon. The signal is again amplified by an amplifier 106 and then applied to a saturable reactor 107 which upon saturation actuates a warning device 108. A power supply 109 provides operating potentials for the amplifiers and the warning device.

In FIGURE 2 transmitters 101 and 102 have rotors 110 and 112, respectively, connected to an alternating power source 97. Transmitter 101 has a Y-connected stator 111 with one winding grounded and arranged so that an output develops across the other two windings which are connected across a resistor 1 and the primary winding 83 of a transformer 62. A resistor 2 is connected in parallel with primary winding 83 and cooperates with resistor 1 in shifting the phase of the signal from transmitter 101 by approximately 60°. Transformer 62 restores the phase shifted voltage to its original value in its secondary winding 84. Transmitter 102 has a Y-connected stator 113 with one winding grounded and arranged so that an output develops across the other two windings which are connected to secondary winding 84. The signals from transmitters 101 and 102 are thus combined in winding 84 and provide a resultant error signal in winding 84 which avoids ambiguity at 180° and is proportional to the angular disparity between rotors 110 and 112 and this proportionality exists regardless of the actual angles involved. The error signal is applied to amplifier 104 which may be of the kind described in the copending application of Robert J. Molnar, Serial No. 680,947, filed August 29, 1957, now Patent No. 2,977,546, March 28, 1961, and assigned to the same assignee as the present application. The amplifier comprises a coupling condenser 21 connected to the base 33 of a transistor 30. A biasing resistor 5 is connected between base 33 and emitter 32 of transistor 30 and series connected biasing resistors 3 and 4 are connected between the base 33 and collector 31 of transistor 30. A pair of resistors 6 and 7 connect emitter 32 to ground and provide degenerative or negative feedback. Resistance 7 is made variable so that the operating point of transistor 30 may be adjusted. A condenser 22 connects the common connections of resistors 3 and 4 to emitter 32 to provide an alternating current by-pass and a load resistor 8 connects collector 31 through a filter network including resistor 11 and condenser 25 to a lead 66 connected to a source of positive potential as described below.

A transformer 61 has its primary winding 81 connected to alternating current source 97 and its secondary winding 82 connected by a pair of diodes 71 and 72 and a filtering resistor 12 to lead 66 to provide a direct current power supply. Center tap 68 on secondary winding 82 is connected to ground lead 67 and a filtering condenser 27 is connected between lines 66 and 67.

The amplified signal from collector 31 is applied through a coupling condenser 23 to the base 43 of a transistor 40 of reverse biased amplifier 105. The collector 41 of transistor 40 is connected to one end of primary winding 85 of an output transformer 63 and the other end of winding 85 is connected to the direct current power supply via line 66. A resistor 10 and a capacitor 24 are connected in parallel between emitter 42 of transistor 40 and ground to prevent feedback or degeneration. A resistor 19 is connected between the emitter and the direct current power supply via line 66 and provides the reverse biasing for transistor 40.

When the amplitude of the error signal from transmitters 101 and 102 applied to detector 103 is above a predetermined value, reversed biased amplifier 105 provides an output voltage across primary winding 85 of transformer 63. Primary winding 85 is inductively coupled to secondary winding 86 of transformer 63 and the output of reversed biased amplifier is applied between base 53 and emitter 52 of transistor 50 of zero biased amplifier 106. The output of transistor 50 on collector 51 is applied to the primary winding 87 of saturable reactor 107 having its secondary windings 88 and 89 connected in series with an alternating power source at tap 69 on primary winding 81 of transformer 61 and a lamp 108. A diode 73 is connected across primary winding 87 of saturable reactor 107 to prevent transient voltages from damaging transistor 50. A tuning condenser 26 is connected across secondary windings 88 and 89 of saturable reactor 107 to increase the quiescent impedance of the circuit. With the arrangement described, lamp 108 will light when sufficient current flows through primary winding 87 of saturable reactor 107 to saturate the core of the reactor and reduce the impedance of windings 88, 89. When no current flows through winding 87, impedance of windings 88, 89 will be sufficient to prevent lamp 108 from lighting.

Figure 3:
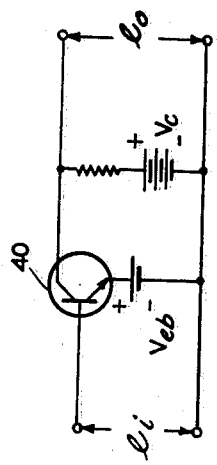
Figure 5:
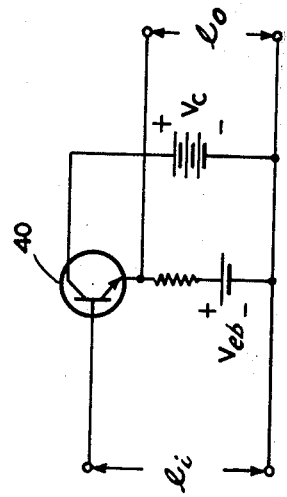

In FIGURE 3 transistor 40 of FIGURE 2 is shown with a grounded emitter connection, FIGURE 4 shows transistor 40 with a grounded base connection and FIGURE 5 shows transistor 40 with a grounded collector connection. For the purpose of simplicity batteries $V_{eb}$ and $V_c$ are shown for supplying the operating potential to the transistor elements. Transistor 40 of FIGURE 2 may be connected as shown in either FIGURES 3, 4 or 5. As shown, transistor 40 is an N.P.N. type by a P.N.P. type could be used by reversing the polarity of all voltages.

Figure 6:
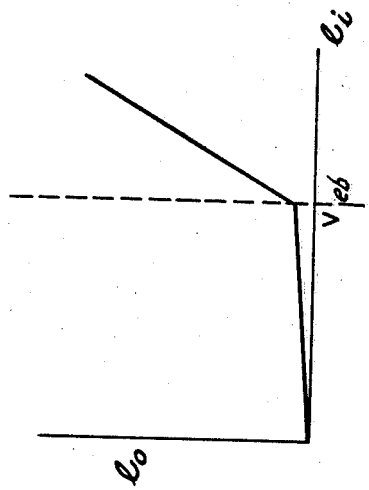
FIGURE 6 shows the relation of the output voltage to input voltage of the reverse biased amplifiers illustrated in FIGURES 3, 4 and 5.

In FIGURE 6 the output voltage $e_o$ is plotted as a function of the input voltage $e_i$ and the curve shows the sharp rise in output voltage $e_o$ when $e_i$ exceeds $V_{eb}$.

Although a number of embodiments of the invention have been illustrated in detail, it is to be expressly understood that the invention is not limited thereto. Various changes may be made in design and arrangement of the parts without departing from the spirit and scope of the invention as will now be understood by those skilled in the art.

We claim:

1. An error detecting and indicating system comprising a source of error signal, a reverse biased transistor amplifier connected to said source and biased to pass only alternate half cycles of the error signal above a predetermined amplitude and providing a voltage corresponding thereto, a saturable reactor connected to the output of said amplifier and a warning device connected to said saturable reactor and responsive to the voltage to indicate an error signal.

2. An error detecting system comprising first and second signal means, means connected thereto for detecting a disparity between said first and second signal means and providing an alternating error signal corresponding to the disparity, a reverse biased transistor amplifier connected to the detector, and means biasing said amplifier to amplify alternate half cycles of the error signal above a predetermined amplitude.

3. An error detecting and indicating system comprising first and second transmitters, a differential voltage detector connected thereto for detecting a disparity between the transmitters and providing an error signal proportional to the disparity, a reverse biased amplifier connected to said detector and biased to pass portions of alternate half cycles of the error signal whose amplitude exceeds a predetermined value, and a saturable reactor connected to the amplifier for actuating an indicating device when said reactor becomes saturated.

4. An error detecting and indicating system comprising first and second transmitters each having first and second movable elements adapted to provide in each of said transmitters a signal corresponding to its displacement, a detector connected to said first and second transmitters and having means to phase shift the signal from one of said transmitters and combine the phase shifted signal with the signal from the other of said transmitters to produce an error signal corresponding to the positional disparity between said first and second movable elements, a reverse biased amplifier connected to the output of said detector and biased to pass and amplify alternate half cycles of the error signal above a predetermined output, and a saturable reactor connected to the output of said amplifier for actuating a warning device when said reactor becomes saturated.

5. An error detecting and indicating system comprising a slowly varying alternating source of error signal, a reverse biased amplifier comprising a transistor having a plurality of electrodes with the error signal source connected to a first electrode, a slowly varying source of direct current potential connected to a second transistor electrode and a source of direct current potential of different magnitude but like polarity connected to a third transistor electrode to render the amplifier conductive during alternate half cycles of the error signal only when the error signal is above a predetermined amplitude and provide a voltage corresponding thereto, a saturable reactor connected to the output of the amplifier, and a warning device connected to the saturable reactor and responsive to the voltage to indicate an error signal.

References Cited in the file of this patent

UNITED STATES PATENTS

| | | |
|---|---|---|
| 1,962,335 | Wensley | June 12, 1934 |
| 2,428,402 | Winterbottom | Oct. 7, 1947 |
| 2,439,414 | Agins | Apr. 13, 1948 |
| 2,517,960 | Barney et al. | Aug. 8, 1950 |
| 2,585,077 | Barney | Feb. 12, 1952 |
| 2,607,007 | Clark | Aug. 12, 1952 |
| 2,623,103 | Kircher | Dec. 23, 1952 |
| 2,629,834 | Trent | Feb. 24, 1953 |
| 2,760,088 | Pittman et al. | Aug. 21, 1956 |
| 2,767,371 | Beaubien | Oct. 16, 1956 |
| 2,772,410 | Logue et al. | Nov. 27, 1956 |
| 2,785,236 | Bright et al. | Mar. 12, 1957 |
| 2,794,076 | Shea | May 28, 1957 |
| 2,837,663 | Walz | June 3, 1958 |
| 2,839,719 | Artzt | June 17, 1958 |